United States Patent [19]
Hancharik

[11] Patent Number: 5,949,822
[45] Date of Patent: Sep. 7, 1999

[54] ENCODING/DECODING SCHEME FOR COMMUNICATION OF LOW LATENCY DATA FOR THE SUBCARRIER TRAFFIC INFORMATION CHANNEL

[75] Inventor: David J. Hancharik, Norcross, Ga.

[73] Assignee: Scientific-Atlanta, Inc., Norcross, Ga.

[21] Appl. No.: 08/866,075

[22] Filed: May 30, 1997

[51] Int. Cl.$^6$ ................................................. H04B 14/04
[52] U.S. Cl. ......................................... 375/242; 370/449
[58] Field of Search .............................. 375/242; 370/427, 370/429, 441, 449, 458

[56] References Cited

U.S. PATENT DOCUMENTS

| | | | |
|---|---|---|---|
| 4,541,095 | 9/1985 | Vries | 371/69 |
| 4,977,582 | 12/1990 | Nichols et al. | 375/118 |
| 5,442,646 | 8/1995 | Chadwick et al. | 371/43 |
| 5,510,798 | 4/1996 | Bauer | 342/357 |
| 5,612,953 | 3/1997 | Olnowich | 370/367 |
| 5,751,773 | 5/1998 | Campana, Jr. | 375/346 |

*Primary Examiner*—Stephen Chin
*Assistant Examiner*—Mohammad Ghayour
*Attorney, Agent, or Firm*—Kenneth M. Massaroni; Kelly A. Gardner; Hubert J. Barnhardt, III

[57] ABSTRACT

A communication system for communicating low latency data in a fading channel environment using a data structure having data frames modulated on a subcarrier signal and on a commercial radio channel bandwidth. Low latency data is updated relatively rapidly at the low latency data generator. Because of this constant changing of low latency data at the point of generation in the transmitter end, the present invention communicates low latency data from the transmitter end to the receiver end of the communication system with relatively low delay. This communication system encodes and decodes low latency data using a single block encoding/decoding scheme. Such an encoding/decoding scheme introduces relatively less delay during the encoding/decoding processes while ensuring satisfactory data integrity for data communication in a fading channel environment. Using such an encoding/decoding scheme leads to more currently generated low latency data transmission at the transmitter end and in relatively less time for the decoding process with the decoder structure being more simple at the receiver end.

12 Claims, 6 Drawing Sheets

ENCODING/DECODING SCHEME FOR COMMUNICATION OF LOW LATENCY DATA FOR THE SUBCARRIER TRAFFIC INFORMATION CHANNEL

FIELD OF THE INVENTION

The present invention relates generally to communication systems for transmitting data to moving vehicles, and more particularly to an encoding/decoding scheme for communicating low latency data within the Subcarrier Traffic Information Channel (STIC).

BACKGROUND

When data is communicated as radio frequency signals from a transmitting antenna to a receiving antenna, the radio frequency signal may travel directly to the receiving antenna. Alternatively however, a component of the radio frequency signal may be reflected from natural or man-made structures such as mountains, trees, or buildings. A first component of the radio frequency signal may be delayed from a second component of the radio frequency signal if the first component follows a different path to the receiving antenna from the path followed by the second component.

Because of an introduction of a phase shift to the first component of the radio frequency signal with respect to the second component, the first component may add or subtract from the second component. Such a subtraction can result in a reduction in signal level at the receiving antenna and is typically referred to as multi-path fading. Multi-path fading reduces the reliability of the data that is received at the receiving antenna after being transmitted from the transmitting antenna.

The problem of multi-path fading is especially acute when the receiving antenna is part of a moving vehicle. In that case, the occurrence of multi-path fading is dependent on the constantly varying position of the moving vehicle, and the level of multi-path fading is unpredictable.

Prior art communication systems deal with this problem of multi-path fading in moving vehicles. For example, U.S. Pat. No. 5,442,646 to Chadwick et al. shows a communication system that includes a comprehensive interleaving and encoding scheme to preserve the integrity of the data that is transmitted to a moving unit via the Subcarrier Traffic Information Channel (STIC). The scheme for a typical data structure used for transmitting data in a fading channel environment can be licensed from Mitre Tek, Inc., Reston, Va. Currently, Mitre Tek, Inc. is a private non-profit organization that is at least partially finded by the federal government and licenses the use of such a data structure for no charge. In addition, a description of this data structure is also available from Mitre Tek, Inc. as Memo No. D053-M-311 dated Sep. 26, 1994, and entitled "STIC Transmitter Software Description." In FIG. 1A, such a data structure 10 includes a superframe 12 that comprises a first data frame 14, a second data frame 16, a third data frame 18, a fourth data frame 20, and so on up to a two hundred and sixteenth data frame 22. Each data frame further includes a synchronization subframe 24, a first data subframe 26, a second data subframe 28, and so on up to a thirty sixth data subframe 30, and a low latency data subframe 32.

In order to assign a reliability factor to every data bit received, the communication system of Chadwick et al. includes at the transmitter end, an encoder, an interleaver, and a framing and synchronization circuit that inserts channel state information to every subframe within each data frame at the transmitter end. The receiving end then includes a channel state bit extractor, a correlation unit, a deinterleaver, and a decoder. The disclosure of U.S. Pat. No. 5,422,646 is incorporated herein by reference.

Although the communication system of U.S. Pat. No. 5,442,646 ensures high integrity in the data transmitted via a radio frequency channel in a fading channel environment, the complex interleaving, correlating, and encoding scheme of that system introduces a relatively high delay during the interleaving/deinterleaving, correlating, and encoding/decoding processes. However, time is of the essence for transmission of certain data, and the delay introduced by the complex interleaving, correlating, and encoding scheme is not acceptable.

For example, for in-vehicle traffic information systems, the Differential Global Positioning System (DGPS) data that is transmitted to a moving vehicle by a DGPS reference station is constantly being updated since the position of the moving vehicle is constantly changing. Because of this constant updating, the DGPS data must be transmitted to the moving vehicle with relatively low latency from the data being generated at the transmitter end to the data being available at the moving vehicle if the DGPS data is to accurately reflect the position of the moving vehicle.

The data structure of FIG. 1A available from Mitre Tek, Inc., Reston, Va. does include a low latency time frame 32 for carrying time-critical data. However, because the data within data structure 10 is used in a fading channel environment, the time-critical data can be corrupted to an unacceptable level if the time-critical data is simply inserted into the low latency data subframe 32 without some encoding/decoding scheme for maintaining acceptable data integrity.

Thus, a communication system that transmits time critical low latency data with relatively little delay yet with acceptable data integrity within a fading channel environment is desired.

OBJECTS OF THE INVENTION

Accordingly, a primary object of the present invention is to provide a communication system that transmits both highly reliable data but with larger delay and that transmits time critical low latency data with relatively little delay yet with acceptable data integrity within the Subcarrier Traffic Information Channel.

In particular, an object of the present invention is to encode and decode the low latency data within single blocks of consecutive data bits with an encoding and decoding scheme that provides low delay with acceptable data reliability.

SUMMARY

In a general aspect of the present invention, a communication system communicates low latency data to a mobile vehicle using a data structure having data frames modulated on a subcarrier signal within a radio channel bandwidth. This communication system includes a transmitter having a data word receiver for receiving a data word having a first predetermined number of bits from a data word generator. The data word is updated every predetermined time period by the data word generator. The transmitter also includes an encoder, operatively coupled to the data word receiver, for encoding the data word and each update of the data word from the data word receiver into an encoded word. The encoded word comprises a second predetermined number of bits that are consecutively within a block of data bits. By encoding the low latency data to be transmitted into a single data block, the encoding scheme of the present invention introduces much less delay in both the transmitter and receiver end of the communication system than the interleaving and encoding scheme of U.S. Pat. No. 5,442,646. This block of data bits fits within a low latency time slot within each data frame of the data structure used by the communication system of the present invention. The transmitter also includes a data frame synchronization circuit, operatively coupled to the encoder, for inserting a last updated encoded word generated last in the encoder into a current low latency time slot within a current data frame when the current low latency time slot is reached within the current data frame.

The communication system of the present invention can be used to particular advantage when used in conjunction with a transmitter end for a commercial radio channel. Thus, the present invention further includes a subcarrier signal generator for generating the subcarrier signal used for modulation within the commercial radio channel. The present invention also includes a modulator, operatively coupled to the subcarrier signal generator and the data frame synchronization circuit, for modulating the data frames onto the subcarrier signal to generate a modulated subcarrier signal. The transmitter of the communication system of the present invention transmits the modulated subcarrier signal after further modulation onto a commercial radio channel bandwidth.

In a further aspect of the present invention, the communication system includes a receiver that includes a radio channel antenna, for receiving the modulated subcarrier signal transmitted by the transmitter. In addition, this receiver includes a demodulator, operatively coupled to the radio channel antenna, for demodulating the modulated subcarrier signal to recover the last updated encoded word. Finally, a decoder, operatively coupled to the demodulator, decodes the last updated encoded word to generate a decoded word which is substantially similar to the data word that was generated by the data word generator and that was encoded into the last updated encoded word by the encoder.

In a related aspect of the present invention, the encoder that encodes the data word into the single block of encoded word uses binary polynomial division encoding. Thus, the encoder of the present invention includes a high bit extension generator for generating a predetermined number of high bits to be appended to the first predetermined number of bits of the data word to generate a first extended data word. The encoder also includes a bit parity word generator for generating a bit parity word by taking a remainder of a binary polynomial division of the first extended data word by a generator polynomial to generate a second extended data word by appending the bit parity word to the first extended data word. The encoder further comprises a low bit extension generator for generating a predetermined number of low bits to be appended to the second extended data word to generate the encoded word.

In another related aspect of the present invention, the decoder of the present invention includes a majority logic decoder for detecting incorrect bits within the decoded data word that are in error and for correcting at least a predetermined number of the incorrect bits by changing the state of the predetermined number of the incorrect bits.

The present invention can be used to particular advantage when used with a data processor for processing the decoded word. For example, the data processor can use data regarding the position of the moving vehicle when the data word that is the low latency data transmitted by the communication system of the present invention includes Differential GPS (Global Positioning System) data.

These and other features and advantages of the present invention will be better understood by considering the following detailed description of the invention which is presented with the attached drawings.

DETAILED DESCRIPTION OF THE PREFERRED EMBODIMENT

Figure 1A:
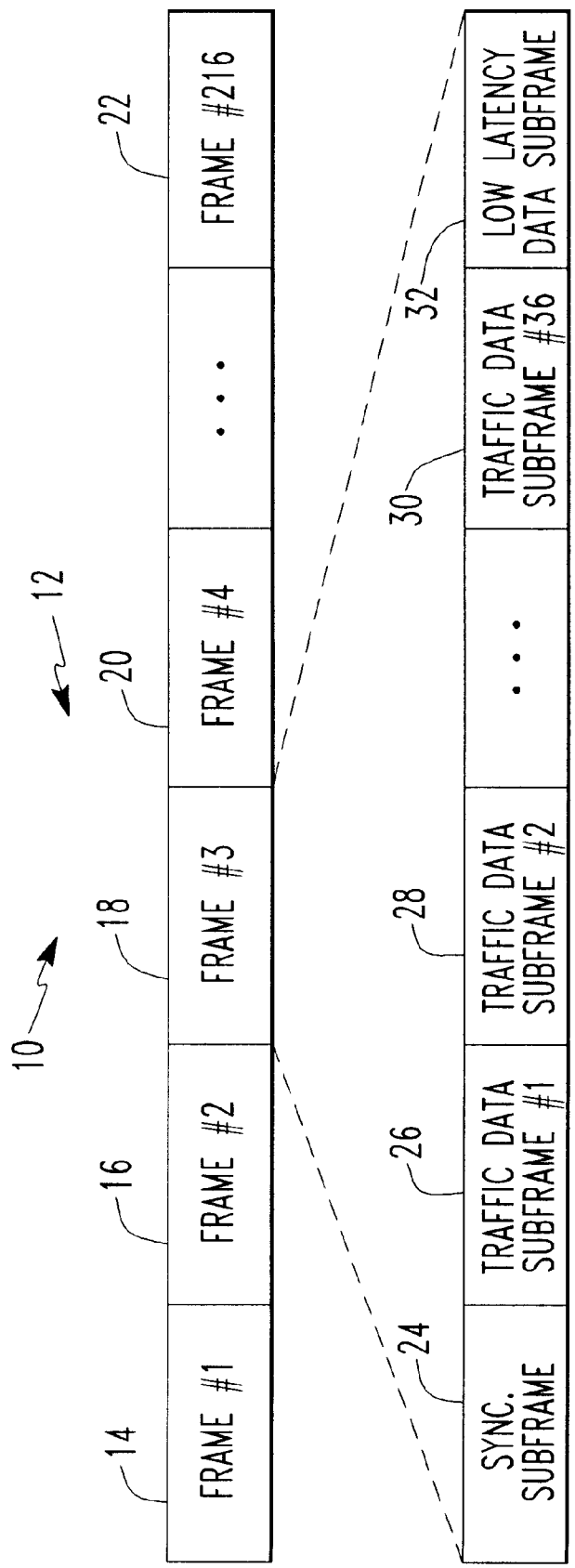
FIG. 1A shows a prior art data structure for transmitting data in a fading channel environment.
Figure 1B:
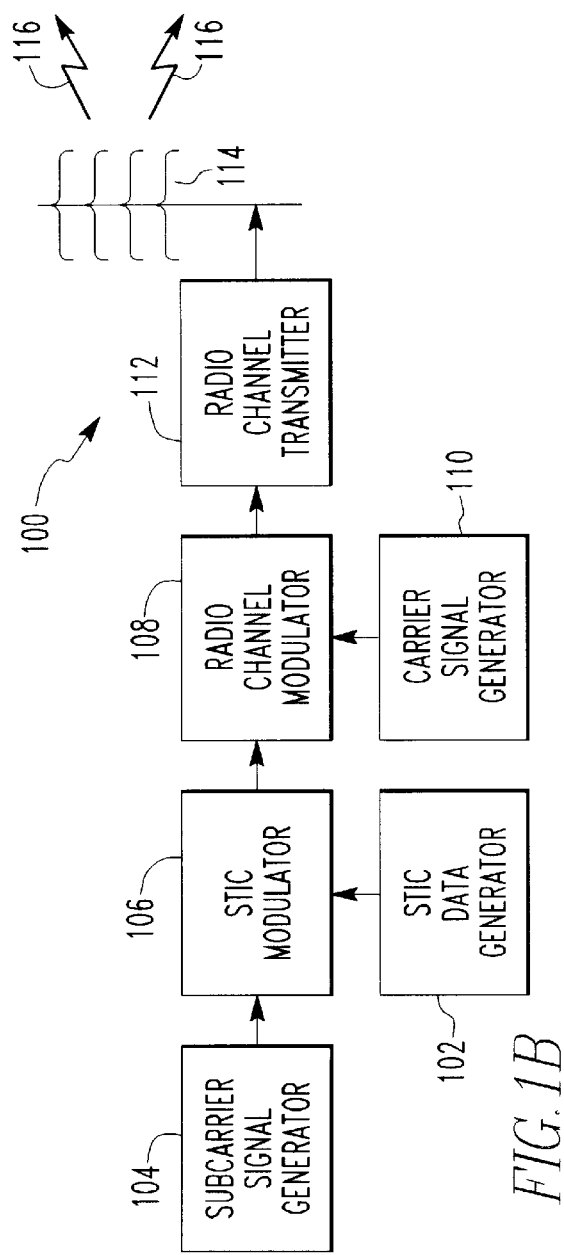
FIG. 1B shows a block diagram of the transmitter end of the communication system of the present invention.

Referring to FIG. 1B, a transmitter 100 of a communication system for communicating data to mobile vehicles within the Subcarrier Traffic Information Channel (STIC) is similar to that disclosed in U.S. Pat. No. 5,442,646. The transmitter includes a STIC data generator 102 and a subcarrier signal generator 104 operatively coupled to a STIC modulator 106. The output of the STIC modulator is coupled to a radio channel modulator 108 which in turn is coupled to a carrier signal generator 110 and a radio channel transmitter 112. The radio channel transmitter is coupled to a transmitter antenna 114.

In the transmitter 100, the STIC data generator 102 generates the data signal to be sent out by the transmitter in the predetermined data format 10 of FIG. 1A for the Subcarrier Traffic Information Channel (STIC). The subcarrier signal generator 104 typically generates a high frequency subcarrier signal which has a frequency of 72.2 KHz for the data frame structure available from Mitre Tek, Inc., Reston, Va. The STIC modulator 106 receives the data signal from the STIC data generator and the subcarrier signal from the subcarrier signal generator. The STIC modulator then modulates the data signal on the subcarrier signal to generate a modulated subcarrier signal. A typical modulation scheme that can be used for this subcarrier modulation is II/4 DQPSK modulation which is well known in the art of signal modulation.

The modulated subcarrier signal is then further modulated onto a commercial radio channel bandwidth which can have frequency ranges within 88 MHZ to 108 MHZ. The radio channel modulator 108 performs this modulation of the modulated subcarrier signal with the carrier signal generated from the carrier signal generator 110. A typical modulation scheme that is used for this radio channel modulation is frequency modulation. The modulated carrier signal via a commercial radio channel is transmitted to mobile vehicles by the radio channel transmitter 112 via the transmitting antenna 114.

The transmitter 100 of the present invention is similar to that of U.S. Pat. No. 5,442,646. However, the STIC data generator component 102 of the present invention is enhanced to include an encoding scheme for handling low latency data in addition to the complex interleaving, correlating, and encoding scheme disclosed in U.S. Pat. No. 5,442,646. By including an encoder for low latency data within the STIC data generator, the communication system of the present invention can communicate time critical data with low latency and with acceptable data integrity. Thus, the present invention provides more flexibility and more accuracy in communication of low latency data.

Figure 2:
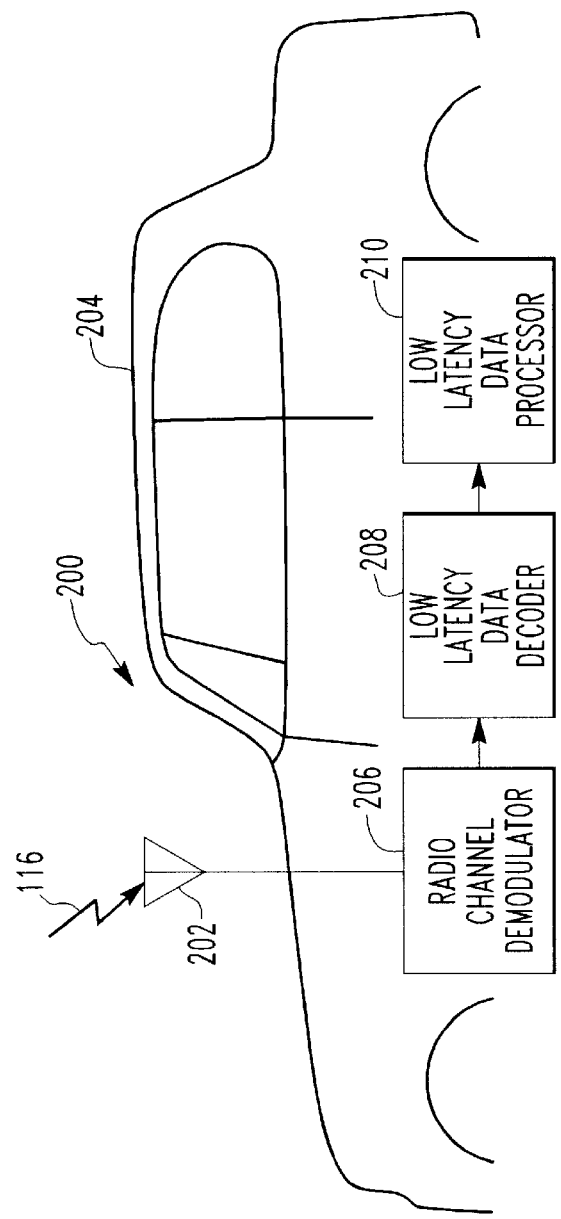
FIG. 2 shows a block diagram of the receiver end of the communication system of the present invention.

Referring to FIG. 2, a receiver 200 of a communication system according to the present invention includes a radio channel antenna 202 for receiving the modulated subcarrier signal 116 transmitted from the transmitter 100. The receiver end is disposed on a mobile vehicle 204. The radio channel antenna is coupled to a radio channel demodulator 206 which is coupled to a low latency data decoder 208 which in turn is coupled to a low latency data processor 210. The radio channel antenna and the radio channel demodulator is similar to that shown in U.S. Pat. No. 5,442,646. The radio channel antenna and the radio channel demodulator can be part of the communication system of U.S. Pat. No. 5,442,646. The communication system of the present invention further includes the low latency data decoder and the low latency data processor.

The receiver 200 of the present invention comprises components for using the low latency data sent within the modulated subcarrier signal 116. The radio channel demodulator 206 demodulates the modulated carrier signal 116 to separate out the data frames of the data signal, that were modulated onto the radio channel carrier signal and the subcarrier signal, to generate demodulated data frames. The demodulated data frames are then sent to both the deinterleaver and decoder within the communication system of U.S. Pat. No. 5,442,646 and the low latency decoder 208 of the present invention which separates out the low latency data subframes from the demodulated data frames. The low latency decoder then decodes each of these low latency data subframes to generate a respective decoded word. The decoded words are then used by the low latency data processor 210 for further application.

A common example of low latency data that is communicated within the Subcarrier Traffic Information Channel (STIC) is Differential Global Positioning System (DGPS) data that indicates the position of the mobile vehicle 204. This data is constantly being updated within the STIC data generator 102 because the position of the vehicle when the vehicle is moving is constantly changing. If this DGPS data is updated within a short time period, then the time delay between the generation of this DGPS data at the STIC data generator 102 and the receipt by the data processor 210 that uses this data needs to be low for accuracy of the DGPS data at the data processor 210. For example, DGPS data is typically used for vehicle navigation systems. If the DGPS data does not timely reach the low latency data processor 210 of the vehicle navigation system, the inaccuracy of the DGPS data received by the vehicle may cause a driver of the vehicle to miss an exit on the highway.

On the other hand, because the communication system of the present invention communicates data to a mobile vehicle, i.e., in a fading channel environment, data integrity needs to be preserved. The encoding/decoding scheme and the data structure used within a communication system determine the level of data integrity as well as the amount of delay between data generation in the transmitter end and data application in the receiver end.

Figure 3:
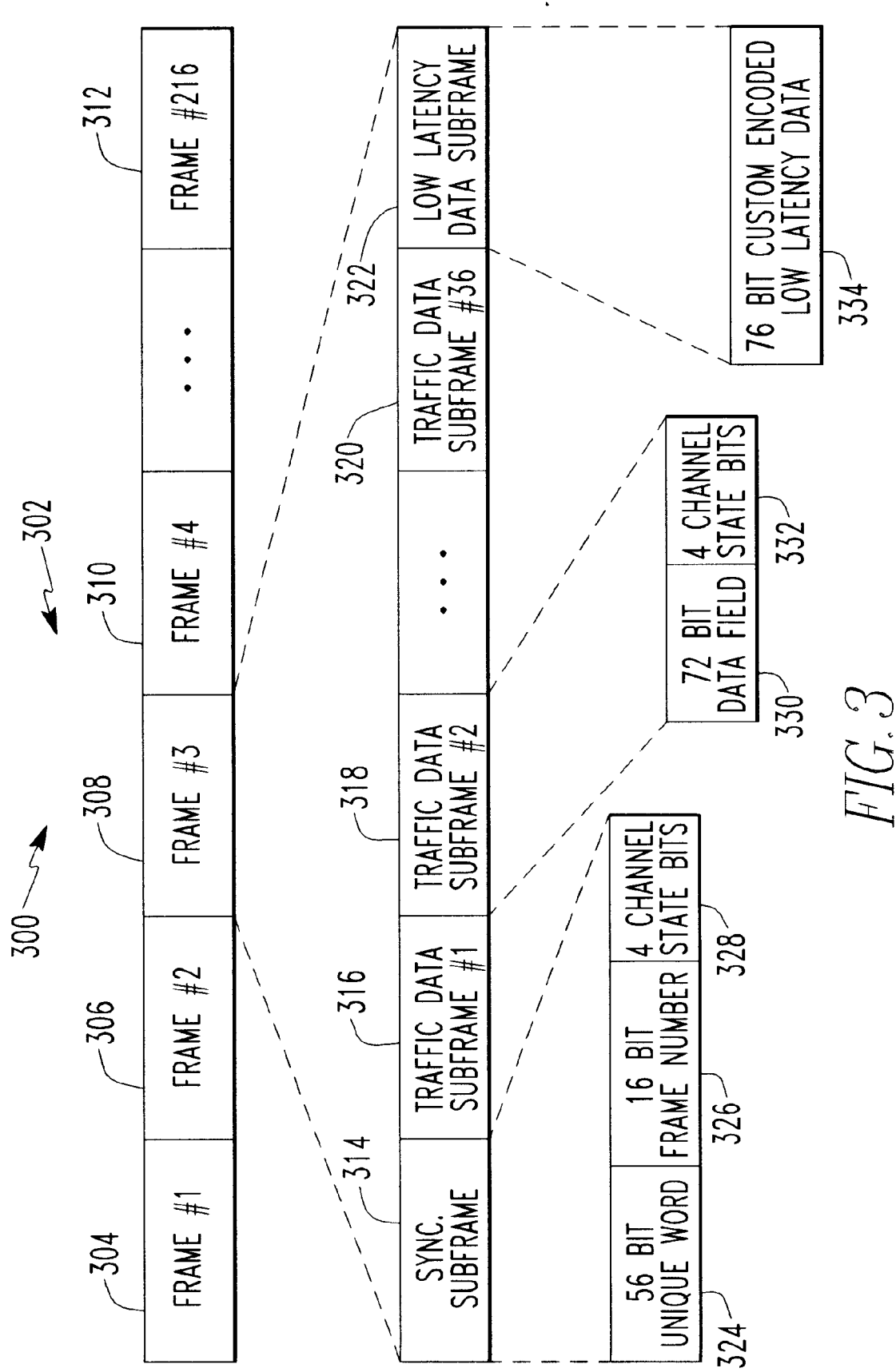
FIG. 3 shows the data structure that is used for communication of data within the Subcarrier Traffic Information Channel (STIC) according to the present invention.

Referring to FIG. 3, a data structure 300 is used for communication of low latency data within the Subcarrier Traffic Information Channel according to the preferred embodiment of the present invention. Typical commercial embodiments of this data structure including the data structure available from Mitre Tek, Inc., Reston Va. include a superframe 302 which comprises a plurality of data frames as discussed in connection with the data structure of FIG. 1A.

Each data frame is comprised of subframes. In FIG. 3, the content of the third data frame 308 is shown. However, all of the other data frames also include the same type of subframes. Each data frame includes a synchronization subframe 314, a first traffic data subframe 316, a second traffic data subframe 318, and so on, up to a thirty sixth traffic data subframe 320, and a low latency data subframe 322. In the data structure embodiment available from Mitre Tek, Inc., Reston Va., each subframe comprises 76 bits of data.

Referring to FIG. 3, the synchronization subframe 314 is comprised of a 56 bit unique word 324 and a 16 bit frame number 326 that uniquely identify the data frame. In addition, 4 channel state bits 328 are also included in the synchronization subframe in accordance with the interleaving/deinterleaving and encoding/decoding schemes that are disclosed in U.S. Pat. No. 5,442,646. Each traffic data subframe is comprised of a 72 bit data field 330 and 4 channel state bits 332 in accordance with the interleaving/deinterleaving and encoding/decoding schemes that are disclosed in U.S. Pat. No. 5,442,646. The data structure 300 of FIG. 3 up to this point in the description is substantially similar to that available from Mitre Tek Inc., Reston, Va.

According to the preferred embodiment of the present invention however, the low latency data subframe 322 is comprised of a 76 bit custom encoded low latency data field 334. The low latency subframe is the most relevant subframe in the implementation of the present invention as the time slot of this subframe carries the low latency data. The other subframes within a data frame carry high integrity data with the relatively higher latency resulting from the complex and comprehensive interleaving/deinterleaving and encoding/decoding scheme of U.S. Pat. No. 5,442,646 used for generating the contents of those subframes.

The data frames are generated within the STIC data generator 102 of FIG. 1B, and consecutive data frames comprise the data signal modulated on the subcarrier signal for transmission. The components of FIG. 1B are also present in U.S. Pat. No. 5,442,646, but the STIC data generator 102 according to the present invention is enhanced to include an encoding scheme for low latency data before this data is incorporated into the low latency data subframe of FIG. 3.

Figure 4A:
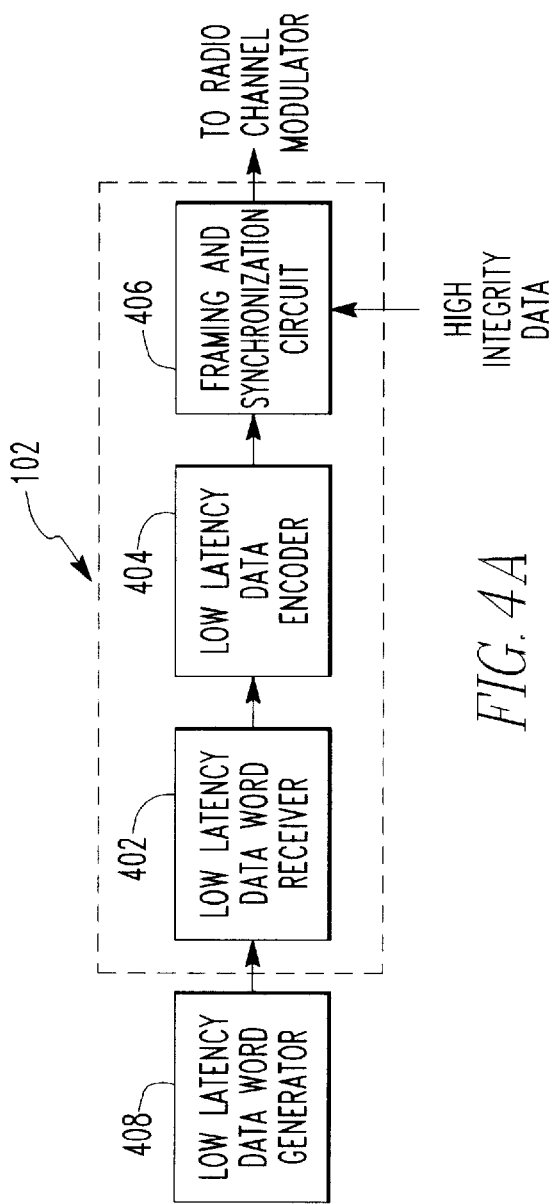
FIG. 4A shows a block diagram of the components of the STIC data generator for communicating low latency data according to the present invention.

FIG. 4A shows the components that enhance the STIC data generator 102 according to the present invention within dashed lines. Those components include a low latency data word receiver 402 coupled to a low latency data encoder 404 which is in turn coupled to a framing and synchronization circuit 406. The low latency data word receiver is coupled to a low latency data word generator 408.

Figure 4B:
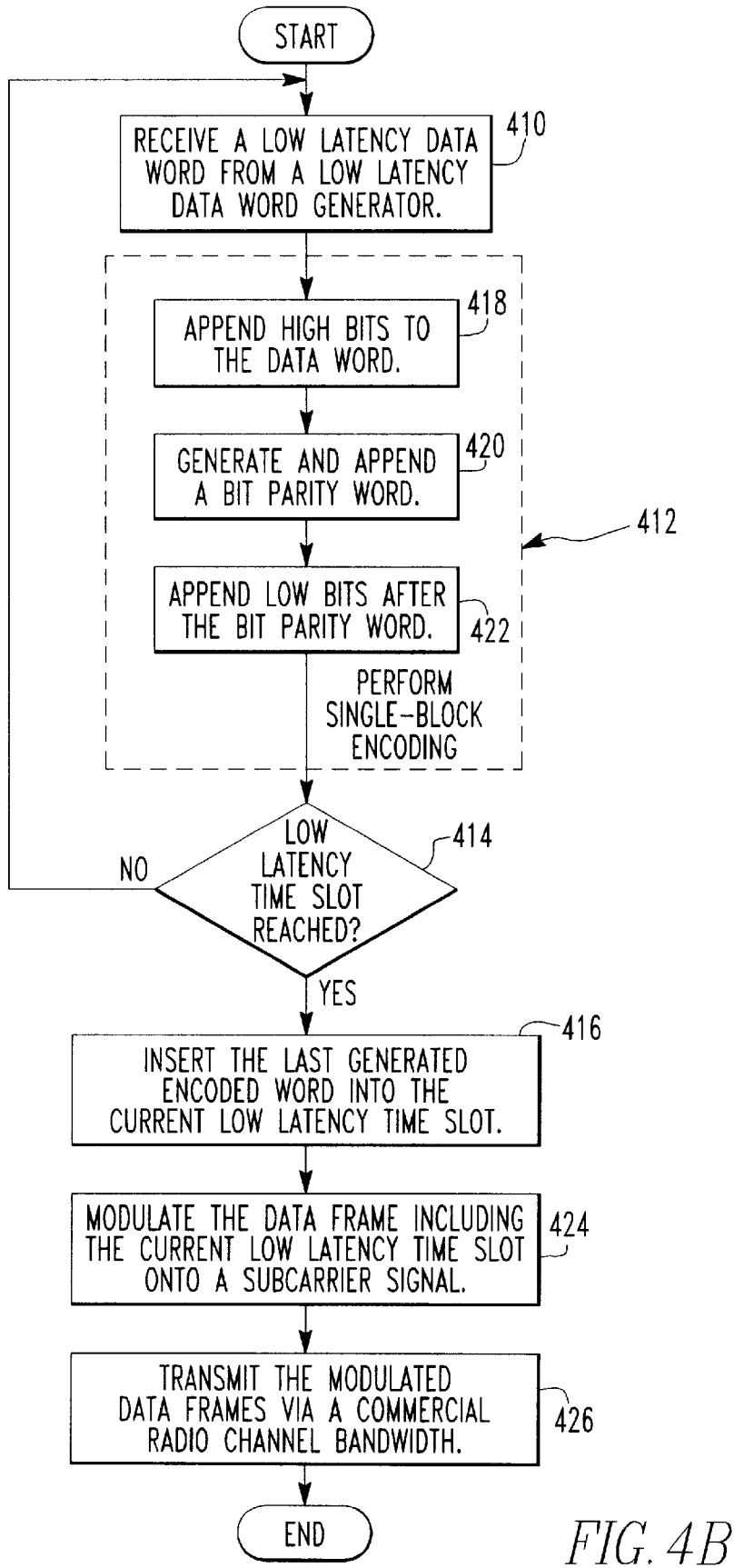
FIG. 4B shows a flowchart of the steps of operation in the transmitter end of the communication system of the present invention.

The operation of the STIC data generator 102 together with the operation of the transmitter 100 is shown by the flowchart of FIG. 4B. This operation begins when the low latency data word generator 408 generates a low latency data word comprising a first predetermined number of bits. For example, for the typical Differential Global Positioning System (DGPS) data generator (i.e., "DGPS reference station" by name in the art of Global Positioning Systems), the low latency data word is a 30 bit word that includes data regarding the position of the mobile vehicle that receives this data. The low latency data word receiver 402 after receiving the complete 30 bits of the low latency data word at step 410 of FIG. 4B sends this word to the low latency data encoder 404. The low latency data encoder encodes the data word into an encoded word that comprises a second predetermined number of bits at step 412 of FIG. 4B.

The second predetermined number of bits of the encoded word is determined by the number of bits in the low latency data subframe and can vary depending on the data structure used in the communication system. Since the data structure of FIG. 3 is used in this preferred embodiment of the present invention, the encoder 404 encodes the data word into a 76 bit encoded word.

In the preferred embodiment of the present invention, a single block code that encodes and decodes a single block of consecutive data bits to another single block of consecutive data bits is used. The preference of the single block code is further discussed hereafter in the specification.

Upon completion of encoding the data word into an encoded word in step 412 of FIG. 4B, a decision is made as to whether a low latency time slot within a current data frame has been reached at step 414 of FIG. 4B. If the low latency time slot is not reached, then steps 410 and 412 are repeated for another updated data word.

If a time slot of a current low latency data subframe within a current data frame is reached, the last 76 bit encoded word generated by the low latency data encoder is incorporated into that current low latency data subframe by the framing and synchronization circuit 406 (at step 416 of FIG. 4B). The framing and synchronization circuit is similar to that of U.S. Pat. No. 5,422,646 and keeps track of the position in the data frame where each data bit is inserted. The 76 bit encoded word fits within a single low latency data subframe.

Note that this encoding scheme converts a single block of consecutive data bits to another single block of consecutive data bits. When used with a decoder that converts a single block of consecutive data bits to another single block of consecutive data bits, such an encoding/decoding scheme is commonly referred to as a "single block code." A single block code is a relatively simple encoding/decoding scheme that introduces relatively low delay during the encoding and decoding processes.

Such low delay is a particularly advantageous feature of the present invention for communicating low latency data. Low latency data by definition is data that should be communicated from the point of generation to the point of application with low delay because that data is changing relatively rapidly.

In the transmitter 100 of FIG. 1B of the communication system of the present invention, a low delay within the encoder 404 means that a more up-to-date data word from the point of generation of that data word is sent within a current data frame. In the receiver 200 of FIG. 2, a low delay within the decoder 208 means that the low latency data reaches the data processor 210 more quickly upon arrival of the data at the moving vehicle.

Referring to the data frame structure as shown in FIG. 3, assume that the current time point is at the beginning of the third data frame 308. In that case, the current data frame is the third data frame 308, and the current low latency time slot is that of the low latency data subframe 322 within the third data frame.

From this time point until the low latency data subframe 322 is reached, the low latency data word generator 408 may generate a plurality of data words. A lower time delay introduced by the data encoder 404 means that the encoded word of a more currently generated data word is incorporated into the current low latency time slot when this time slot is reached.

For example, assume that the time period between the beginning of the third data frame 308 and the beginning of the low latency data subframe 322 is 11 seconds. Assume also that the low latency data word generator 408 updates the data word generated every predetermined time period such as 2 seconds. Then, 5 data words are generated, with each of those data words being generated every 2 seconds, during the 11 seconds time interval between the beginning of the third data frame 308 and the beginning of the low latency data subframe 322.

If the delay of encoding the data word in the encoder 404 were 10 seconds, then only the oldest data word of those 5 data words has been completely encoded by the time the low latency subframe 322 is reached. In that case, only the encoded word of that oldest data word can be incorporated into this current low latency time slot for transmission. Thus, the data word that is transmitted is not current since four subsequent data words have already been generated.

In contrast, assume that the delay of encoding the data word in the encoder 404 were to be reduced to 1 second from the previous assumption of 10 seconds. In that case, the encoded word of the lastly generated word of the 5 data words is available to be incorporated into the current low latency time slot 322 for transmission by the time this low latency time slot is reached.

Being able to transmit a more current data word is particularly advantageous where the data word is rapidly changing. For example, where DGPS data is the low latency data being communicated for use in a vehicle navigation system, a non-current data may cause the driver of the vehicle to miss a highway exit.

Single block codes for encoding/decoding introduce relatively low delay during the encoding and decoding process. A preferred embodiment for such an encoder is now described, and the preferred embodiment of the corresponding decoder will be described thereafter.

Figure 5:
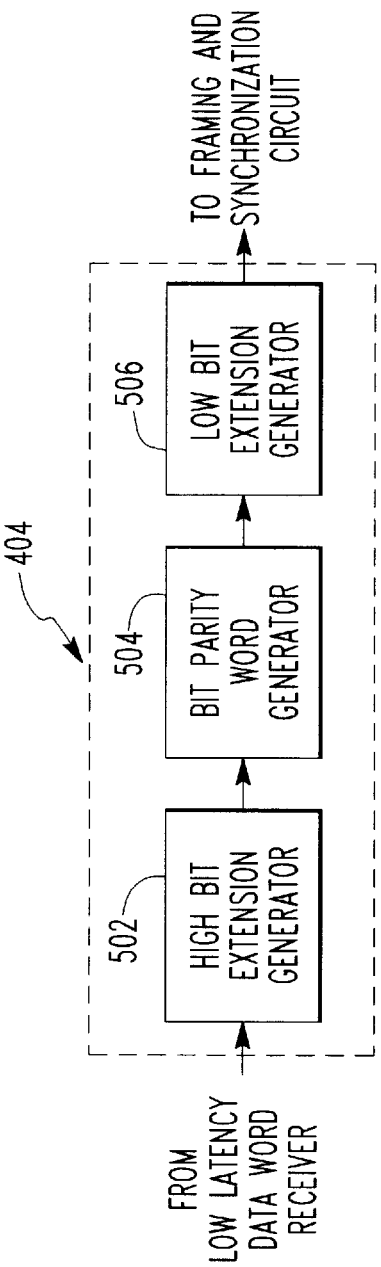
FIG. 5 shows a block diagram of the components of the low latency data encoder of FIG. 4A that implements the encoding scheme for the low latency data according to a preferred embodiment of the present invention.

In a preferred embodiment of the present invention, the low latency data encoder 404 uses binary polynomial division to generate a bit parity word. Referring to FIG. 5, the components of such a low latency data encoder 404 are shown within dashed lines. The encoder includes a high bit extension generator 502 which is coupled to the low latency data word receiver 402. The encoder also includes a bit parity word generator 504 which is coupled to the high bit extension generator and a low bit extension generator 506.

The operation of the encoder 404 starts upon receiving a low latency data word that has been generated by the low latency data word generator 408. Assume that this data word is for typical DGPS data and comprises 30 bits of data. Assume a representation of this data word as an array of binary variables $b(1), b(2), b(3), \ldots, b(30)$ where the least significant bit (LSB) is $b(1)$ and the most significant bit (MSB) is $b(30)$. The encoder 404 encodes this block of binary variables into another block of binary variables comprising 76 bits that can fit within the low latency time slot of the data structure of FIG. 3. Assume a representation of this encoded word as an array of binary variables c(1), c(2), c(3), . . . , c(76) where c(1) is the first bit to be transmitted and c(76) is the last bit to be transmitted within the low latency time slot.

To encode the 30 bit DGPS data word into the 76 bit encoded word, first, the high bit extension generator 502 appends a predetermined number of high bits to that 30 bit data word (at step 418 in FIG. 4B). In a preferred embodiment, the data word is extended to a 45 bit first extended data word with the last 15 bits having a high state of 1. If this first extended data word can be represented as an array of binary variables d(1), d(2), d(3), . . . , d(45), then d(1), d(2)=b(b2), d(3)=b(3), . . . , d(30)=b(30). Moreover, d(31) through d(45) are equal to 1.

Next, within the single block encoder 404, the bit parity word generator 504 generates a 28 bit parity word that is appended to the first extended data word to form a second extended data word (at step 420 in FIG. 4B). Assume a representation of this bit parity word as an array of binary variables p(1), p(2), p(3), . . . , p(28). This bit parity word is generated by taking the remainder of a binary polynomial division of the first extended data word by a 29 bit generator polynomial. Assume a representation of the 29 bit generator polynomial as an array of binary variables g(1), g(2), g(3), . . . , g(29). Then, in the preferred embodiment of the present invention, "g" has the following predetermined array of binary variables:

g=[10101010100010001000001001001]

The bit parity word "p"=Rem(d/g), where Rem(d/g) represents the remainder of the binary polynomial division of the first extended word "d" by the generator polynomial "g". This binary polynomial division for generating the bit word p(1) through p(28) is equivalent to the following iterative algorithm:

$$p(1), p(2), p(3), \ldots, p(28) = 0$$
$$i = 1 \text{ to } 45$$
$$k = p(1) + d(i)$$
$$j = 1 \text{ to } 27$$
$$p(j) = p(j+1) + g(29-j)k$$
$$\text{done}$$
$$p(28) = k$$
$$\text{done}$$

In this algorithm, all additions and multiplications are in module 2.

Assume a representation of the second extended data word which is comprised of the first extended data word "d" appended with the bit parity word "p" as an array of 73 binary variables e(1), e(2), e(3), . . . , e(73). Then e(1), e(2)=d(2), e(3)=d(3), . . . , e(45)=d(45). In addition with appending the bit parity word to the first extended data word, e(46)=p(1), e(47)=p(2), e(48)=p(3), . . . , e(73)=p(28).

Finally, within the single block encoder 404, the low bit extension geneator 506 generates the encoded word "c" by appending a predetermined number of low bits to the second extended data word "e" to ensure that the encoded word is comprised of 76 bits (step 422 in FIG. 4B). Since the second extended word comprises 73 bits, the low bit extentsion generator would append 3 low bits to the second extended word to generate the encoded word. With the encoded word being represented as an array of binary variables c(1), c(2), c(3), . . . , c(76), c(1)=e(1), c(2)=e(2), c(3)=e(3), . . . , c(73)=e(73). In addition, the low bit extension generator provides that c(74)=0, c(75)=0, and c(76)=0.

This encoded word is then sent to the framing and synchronization circuit 406 of FIG. 4A. The framing and synchronization circuit waits until a low latency subframe within a current data frame is reached and inserts the encoded word generated last in the low latency data encoder 404 at that time point.

Referring back to FIGS. 1 and 2, once an encoded word has been incorporated into the current data frame, that word is transmitted to the mobile vehicle 204 via a commercial radio channel bandwidth at step 426 of FIG. 4B after being modulated onto the subcarrier signal at step 424 of FIG. 4B. The radio channel antenna 202 detects this transmitted signal, and the radio channel demodulator 206 demodulates this detected signal to separate out the data frames from the subcarrier signal.

The low latency data decoder 208 then separates out the encoded words within the low latency data subframes and decodes these encoded words back to the word as originally generated by the low latency data word generator 408. The decoder 208 can begin decoding as soon as the 76 bits of an encoded word are available from the radio channel demodulator 206. The decoder 208 decodes this block of the 76 bit encoded word back to the block of the original 30 bit data word, and thus, decoder 208 is a single block decoder.

Such a decoder introduces less delay in the decoding process than the deinterleaver and decoder of U.S. Pat. No. 5,422,646 that uses channel state bits within all subframes for the decoding process. In contrast, the single block decoder 208 of the present invention uses data bits within a single subframe, i.e., the low latency data subframe, to begin the decoding process. In distinction, the communication system of U.S. Pat. No. 5,422,646 must receive the information from all subframes within a data frame before beginning its decoding process. This lower latency by the decoder of the present invention is particularly advantageous for communication of low latency data that should reach low latency data processor 210 as quickly as possible upon generation. Thus, the single block encoding/decoding scheme of the present invention results in lower latency at the receiver 200 as well as at the transmitter 100 of the communication system.

Figure 6:
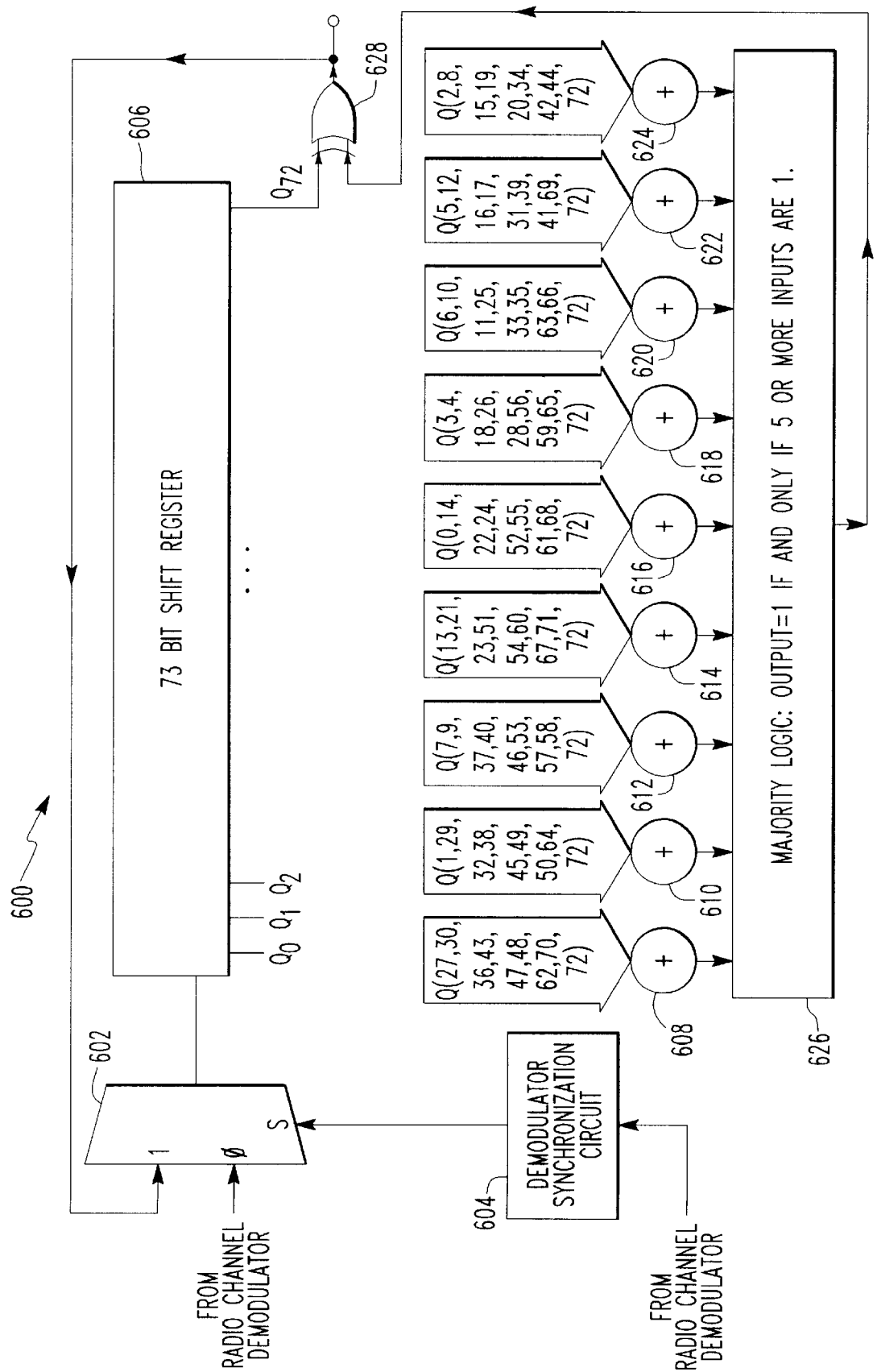
FIG. 6 shows an implementation for the decoder of FIG. 2 that uses majority logic decoding according to a preferred embodiment of the present invention.

Referring to FIG. 6, a preferred embodiment of a low latency data decoder 600 converts the 76 bit encoded word back to the original 30 bit data word. This decoder includes a multiplexer 602 and a demodulator synchronization circuit 604 that are both coupled to the radio channel demodulator 206 of FIG. 2 to receive the encoded data frames. The demodulator synchronization circuit 604 is coupled to the control terminal of the multiplexer 602.

The output of the multiplexer is coupled to a input of a 73 bit shift register 606. The 73 outputs of the shift register 606 are coupled to at least one of a first 9-input exclusive OR gate 608, a second 9-input exclusive OR gate 610, a third 9-input exclusive OR gate, 612, a fourth 9-input exclusive OR gate 614, a fifth 9-input exclusive OR gate 616, a sixth 9-input exclusive OR gate 618, a seventh 9-input exclusive OR gate 620, an eighth 9-input exclusive OR gate 622, and a ninth 9-input exclusive OR gate 624. The output of each of these nine exclusive OR gate is coupled to a majority logic unit 626.

The output of the majority logic unit 626 is coupled to one of the inputs of a 2-input exclusive OR gate 628. The last 73rd bit in the output of the 73 bit shift register 606 is coupled to the other input of the 2-input exclusive OR gate 628. The output of the 2-input exclusive OR gate 628 is the output of the low latency data decoder 600. This output is fed back to one of the inputs of the multiplexer 602.

The operation of the decoder 600 begins the arrival of demodulated encoded bits of a data frame at the multiplexer 602 and the demodulator synchronization circuit 604. The demodulator synchronization circuit keeps track of the status of each encoded bit from the location of each of the encoded bits from the synchronization subframe within each data frames as shown in FIG. 3. When the beginning of a low latency data subframe is reached, the demodulator synchronization circuit controls the multiplexer 602 to clock in the 76 bit encoded word within the low latency data subframe into the 73 bit shift register 606. Furthermore, the demodulator synchronization circuit controls the multiplexer 602 to clock in only the first 73 bit of the 76 bit encoded word. After the 73rd bit has been shifted into that shift register, the synchronization circuit 604 controls the mutliplexer 602 to switch to the outer input of the feed back output from the 2-input exclusive OR gate 628.

Each output of the 73 bit shift register 606 is coupled to at least one of the nine-input exclusive OR gates, 608–624. Assume that the 73 outputs from the shift register are represented as $Q_0, Q_1, Q_2, \ldots, Q_{72}$, with $Q_0$ being the last shifted encoded bit and $Q_{72}$ being the oldest shifted encoded bit. Then, the first 9-input exclusive OR gate 608 has $Q_{27}$, $Q_{30}$, $Q_{36}$, $Q_{43}$, $Q_{47}$, $Q_{48}$, $Q_{62}$, $Q_{70}$, and $Q_{72}$ as its input. Similarly, the second 9-input exclusive OR gate 610 has $Q_1$, $Q_{29}$, $Q_{32}$, $Q_{38}$, $Q_{45}$, $Q_{49}$, $Q_{50}$, $Q_{64}$, and $Q_{72}$ as its input. The third 9-input exclusive OR gate 612 has $Q_7$, $Q_9$, $Q_{37}$, $Q_{40}$, $Q_{46}$, $Q_{53}$, $Q_{57}$, $Q_{58}$, and $Q_{72}$ as its input. The fourth 9-input exclusive OR gate 614 has $Q_{13}$, $Q_{21}$, $Q_{23}$, $Q_{51}$, $Q_{54}$, $Q_{60}$, $Q_{67}$, $Q_{71}$, and $Q_{72}$ as its input. The fifth 9-input exclusive OR gate 616 has $Q_0$, $Q_{14}$, $Q_{22}$, $Q_{24}$, $Q_{52}$, $Q_{55}$, $Q_{61}$, $Q_{68}$, and $Q_{72}$ as its input. The sixth 9-input exclusive OR gate 618 has $Q_3$, $Q_4$, $Q_{18}$, $Q_{26}$, $Q_{28}$, $Q_{56}$, $Q_{59}$, $Q_{65}$, and $Q_{72}$ as its input. The seventh 9-input exclusive OR gate 620 has $Q_6$, $Q_{10}$, $Q_{11}$, $Q_{25}$, $Q_{33}$, $Q_{35}$, $Q_{63}$, $Q_{66}$, and $Q_{72}$ as its input. The eighth 9-input exclusive OR gate 622 has $Q_5$, $Q_{12}$, $Q_{16}$, $Q_{17}$, $Q_{31}$, $Q_{39}$, $Q_{41}$, $Q_{69}$, and $Q_{72}$ as its input. Finally, the ninth 9-input exclusive OR gate 624 has $Q_2$, $Q_8$, $Q_{15}$, $Q_{19}$, $Q_{20}$, $Q_{34}$, $Q_{42}$, $Q_{44}$, and $Q_{72}$ as its input.

The output of any of these nine 9-input exclusive OR gates is a high, i.e. a 1, if an odd number of the 9-input bits are high, and the output is a low, i.e. a 0, if an even number of the 9-input bit are high. The output of each of these nine 9-input exclusive OR gates is coupled to the majority logic unit 626. The output of the majority logic unit is a high, i.e. a 1, if and only if 5 or more inputs to the majority logic are high.

The output of the majority logic unit 626 and the 73rd bit in the output of the 73 bit shift register 606 are inputs to the 2-input exclusive OR gate 628. The output of this 2-input exclusive OR gate is the output of the decoder 600. After the first 73 bits of the 76-bit encoded low latency word have been shifted into the 73 bit shift register, the next clock cycle and the subsequent 29 clock cycles generates the decoded 30 bit data word at the output of the 2-input exclusive OR gate 628.

This decoded 30 bit data word is substantially similar to the 30 bit data word that was originally generated by the low latency data word generator and that was encoded into the 76 bit encoded word that has just been decoded. However, because of transmission of data to a mobile vehicle, i.e., in a fading channel environment, data integrity may have been diminished in the transmission. The majority logic unit 626 detects for an error in any of the bits of the decoded 30 bit word due to diminished data integrity.

The bits coming from the 73rd bit output of the 73 bit shift register acts as the potentially corrupted decoded 30 bit word. With the decoder 600 of FIG. 6, the output of the majority logic unit 626 goes high if the bit at that 73rd bit output of the shift register 606 is in error, and the 2-input exclusive OR gate 628 changes the state of that incorrect bit. In this manner, the output of that exclusive OR gate has the correct bit at the position of that incorrect bit. The mathematical reason for why the encoder 404 of FIG. 5 and the decoder 600 work in this manner is known in the prior art. A prior art reference that describes this mathematical reason is the book, *Error Correction Coding for Digital Communications*, by George C. Clark and J. Bibb Cain, Plenum Press, 1981, (2nd Printing, August 1982), pgs. 133–140.

The decoder 600 guarantees a correction of up to 4 bits that may be in error in the decoded data word. The decoder 600 may or may not correct more data bits that are in error depending on the pattern of data bits. Such a decoder 600 is a single block decoder that has a relatively simple structure, that introduces relatively low delay during the decoding process, and that still provides relatively satisfactory data integrity for effective communication of low latency data. The relatively simple structure of decoder 600 is especially advantageous for providing a low cost receiver 200 of FIG. 2 within numerous mobile vehicles that may carry the receiver.

In this manner, the present invention effectively provides a low latency encoding/decoding scheme for transmission of low latency data within the Subcarrier Traffic Information Channel (STIC) that uses a commercial radio channel for communication of data. The encoding and decoding scheme of the preferred embodiment of the present invention are single block encoding/decoding schemes that introduce relatively low delay in the encoding and decoding processes while ensuring a satisfactory data integrity for communication in a fading channel environment. Implementation of the preferred embodiment of the present invention as described herein shows a delay time of 3.5–4 seconds from data generation at the low latency data word generator 408 of FIG. 4A to data application at the low latency data processor 210 of FIG. 2 for the encoding/decoding scheme of the present invention in contrast to a delay time of 30–40 seconds for the interleaving/deinterleaving and the encoding/decoding scheme of U.S. Pat. No. 5,422,646.

The forgoing description is by way of example only and is not intended to be limiting. For example, any data structure using data frames having a low latency data subframe can be used with this invention. Thus, the exact number of bits of the generated low latency data or the encoded data word, or the exact length of each data frame is not critical to the practice of the present invention. More importantly, other single block encoding/decoding schemes that introduce relatively low delay can be used in the present invention. Any patents referred to herein should be deemed to be incorporated by reference as to any subject matter deemed essential to a proper understanding of the present invention. The invention is limited only as defined in the following claims and equivalents thereof. Additionally, any patents and publications referred to herein are incorporated by reference.

What is claimed is:

1. A method for communicating low latency data to a mobile vehicle within a communication system that uses a data structure having data frames modulated on a subcarrier signal and on a commercial radio channel bandwidth, said method including the steps of:

A. receiving a data word from a data word generator, said data word comprising a first predetermined number of bits, said data word being updated every predetermined time period by said data word generator;

B. generating an encoded word from said data word, said encoded word comprising a second predetermined number of bits that are consecutively within a block of data bits, said block of data bits fitting within a low latency time slot within each data frame of said data structure in said communication system, said step B further comprising the steps of appending a predetermined number of high bits to said first predetermined number of bits of said data word to generate a first extended data word;

generating a bit parity word by taking a remainder of a binary polynomial division of said first extended data word by a generator polynomial to generate a second extended data word by appending said bit parity word to said first extended data word;

appending a predetermined number of low bits to said second extended data word to generate said encoded word; and C. repeating steps A and B for each update of said data word to generate a respective updated encoded word for each update of said data word until a current low latency time slot within a current data frame is reached, said current low latency time slot being used to carry a last updated encoded word which is said encoded word generated last in step B when said current low latency time slot is reached.

2. The method for communicating low latency data as recited in claim 1, further including the steps of:

D. incorporating said last updated encoded word into said current low latency time slot within said current data frame;

E. modulating said current data frame onto said subcarrier signal; and

F. transmitting the modulated subcarrier signal via said commercial radio channel bandwidth.

3. The method for communicating low latency data as recited in claim 2, further including the steps of:

G. receiving said transmitted modulated subcarrier signal at said mobile vehicle;

H. demodulating said modulated subcarrier signal to recover said last updated encoded word; and I. decoding said last updated encoded word, upon recovery of said block of second predetermined number of bits of said last updated encoded word in step H, to generate a decoded word which is substantially similar to said data word that was generated by said data word generator and that was encoded into said last updated encoded word in one of steps B and C.

4. The method for communicating low latency data as recited in claim 3, further including the step of:

J. sending said decoded word to a data processor for processing said decoded word.

5. The method for communicating low latency data as recited in claim 4, wherein said data word comprises Differential Global Positioning System (GPS) data.

6. The method for communicating low latency data as recited in claim 3, wherein step I includes the step of:

detecting incorrect bits within said decoded data word that are in error using majority logic decoding; and correcting at least a predetermined number of said incorrect bits by changing the state of said predetermined number of said incorrect bits using majority logic decoding.

7. A method for communicating low latency data to a mobile vehicle within a communication system that uses a data structure having data frames modulated on a subcarrier signal within a radio channel bandwidth, said method including the steps of:

A. receiving a data word from a data word generator, said data word comprising a first predetermined number of bits, said data word being updated every predetermined time period by said data word generator;

B. generating an encoded word from said data word, said encoded word comprising a second predetermined number of bits that are consecutively within a block of data bits, said block of data bits fitting within a low latency time slot within each data frame of said data structure in said communication system, said step B including the steps of appending a predetermined number of high bits to said first predetermined number of bits of said data word to generate a first extended data word;

generating a bit parity word by taking a remainder of a binary polynomial division of said first extended data word by a generator polynomial to generate a second extended data word by appending said bit parity word to said first extended data word; and appending a predetermined number of low bits to said second extended data word to generate said encoded word;

C. repeating steps A and B for each update of said data word to generate a respective updated encoded word for each update of said data word until a current low latency time slot within a current data frame is reached, said current low latency time slot being used to carry a last updated encoded word which is said encoded word generated last in step B when said current low latency time slot is reached;

D. incorporating said last updated encoded word into said current low latency time slot within said current data frame;

E. modulating said current data frame onto said subcarrier signal;

F. transmitting said modulated subcarrier signal via a commercial radio channel bandwidth;

G. receiving said transmitted modulated subcarrier signal at said mobile vehicle;

H. demodulating said modulated subcarrier signal to recover said last updated encoded word;

I. decoding said last updated encoded word, upon recovery of said block of second predetermined number of bits of said last updated encoded word from said current data frame in step H, to generate a decoded data word which is substantially similar to said data word that was generated by said data word generator and that was encoded into said last updated encoded word in one of steps B and C, said step I including the steps of detecting incorrect bits within said decoded data word that are in error using majority logic decoding; and correcting at least a predetermined number of said incorrect bits by changing the state of said predetermined number of said incorrect bits using majority logic decoding; and J. sending said decoded data word to a data processor for processing said decoded data word.

8. The method for communicating low latency data as recited in claim 7, wherein said data word comprises Differential Global Positioning System (GPS) data.

9. A transmitter of a communication system for communicating low latency data to a mobile vehicle within a data structure having data frames modulated on a subcarrier signal and on a commercial radio channel bandwidth, said transmitter comprising:

a data word receiver for receiving a data word having a first predetermined number of bits from a data word generator, said data word being updated every predetermined time period by said data word generator;

an encoder, operatively coupled to said data word receiver, for encoding said data word and each update of said data word from said data word receiver into an encoded word, said encoded word comprising a second predetermined number of bits that are consecutively within a block of data bits, said block of data bits fitting within a low latency time slot within each data frame of said data structure in said communication system, wherein said encoder further includes
      a high bit extension generator for generating a predetermined number of high bits to be appended to said first predetermined number of bits of said data word to generate a first extended data word;
      a bit parity word generator for generating a bit parity word by taking a remainder of a binary polynomial division of said first extended data word by a generator polynomial to generate a second extended data word by appending said bit parity word to said extended data word,
      a low bit extension generator for generating a predetermined number of low bits to be appended to said second extended data word to generate said encoded word; and a data frame synchronization circuit, operatively coupled to said encoder, for inserting a last updated encoded word generated last in said encoder into a current low latency time slot within a current data frame when said current low latency time slot is reached within said current data frame.

10. The transmitter as recited in claim 9, further comprising:

a subcarrier signal generator for generating said subcarrier signal;

a modulator, operatively coupled to said subcarrier signal generator and said data frame synchronization circuit, for modulating said data frames onto said subcarrier signal to generate a modulated subcarrier signal; and a transmitter for transmitting said modulated subcarrier signal via a commercial radio channel bandwidth.

11. A communication system for communicating low latency data to a mobile vehicle within a data structure having data frames modulated on a subcarrier signal within a radio channel bandwidth, said apparatus comprising:

a data word receiver for receiving a data word having a first predetermined number of bits from a data word generator, said data word being updated every predetermined time period by said data word generator;

an encoder, operatively coupled to said data word receiver, for encoding said data word and each update of said data word from said data word receiver into an encoded word, said encoded word comprising a second predetermined number of bits that are consecutively within a block of data bits, said block of data bits fitting within a low latency time slot within each data frame of said data structure in said communication system, said encoder further comprising:
      a high bit extension generator for generating a predetermined number of high bits to be appended to said first predetermined number of bits of said data word to generate a first extended data word;
      a bit parity word generator for generating a bit parity word by taking a remainder of a binary polynomial division of said first extended data word by a generator polynomial to generate a second extended data word by appending said bit parity word to said first extended data word; and
      a low bit extension generator for generating a predetermined number of low bits to be appended to said second extended data word to generate said encoded word;

a data frame synchronization circuit, operatively coupled to said encoder, for inserting a last updated encoded word generated last in said encoder into a current low latency time slot within a current data frame when said current low latency time slot is reached within said current data frame;

a subcarrier signal generator for generating said subcarrier signal;

a modulator, operatively coupled to said subcarrier signal generator and said data frame synchronization circuit, for modulating said data frames onto said subcarrier signal to generate a modulated subcarrier signal;

a transmitter for transmitting said modulated subcarrier signal via a commercial radio channel bandwidth;

a radio channel antenna, disposed on said mobile vehicle, for receiving said modulated subcarrier signal transmitted by said transmitter;

a demodulator, operatively coupled to said radio channel antenna, for demodulating said modulated subcarrier signal to recover said last updated encoded word;

a decoder, operatively coupled to said demodulator, for decoding said last updated encoded word to generate a decoded word which is substantially similar to said data word that was generated by said data word generator and that was encoded into said last updated encoded word by said encoder, said decoder further comprising:
      a majority logic decoder for detecting incorrect bits within said decoded data word that are in error and for correcting at least a predetermined number of said incorrect bits by changing the state of said predetermined number of said incorrect bits; and a data processor, operatively coupled to said decoder, for processing said decoded word.

12. The communication system as recited in claim 11, wherein said data word includes Differential GPS (Global Positioning System) data.

* * * * *